No. 791,825. PATENTED JUNE 6, 1905.
C. SCUDDER & R. BARLOW.
NUT LOCK.
APPLICATION FILED MAR. 8, 1905.
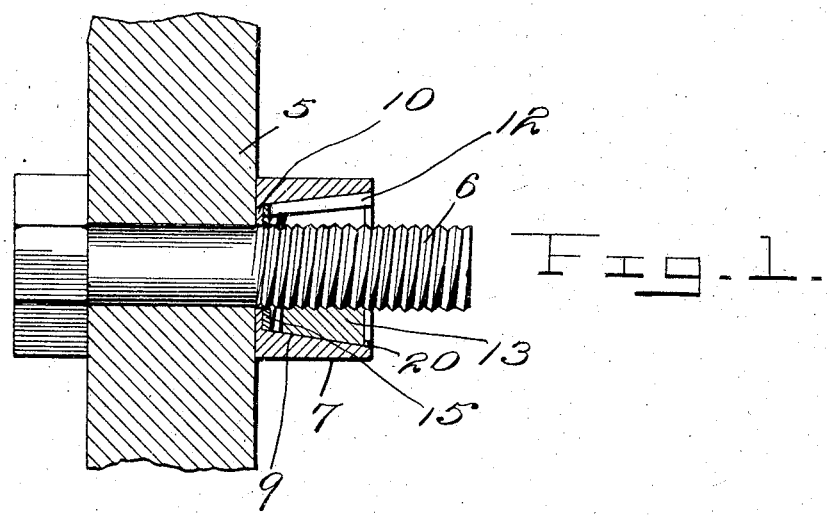
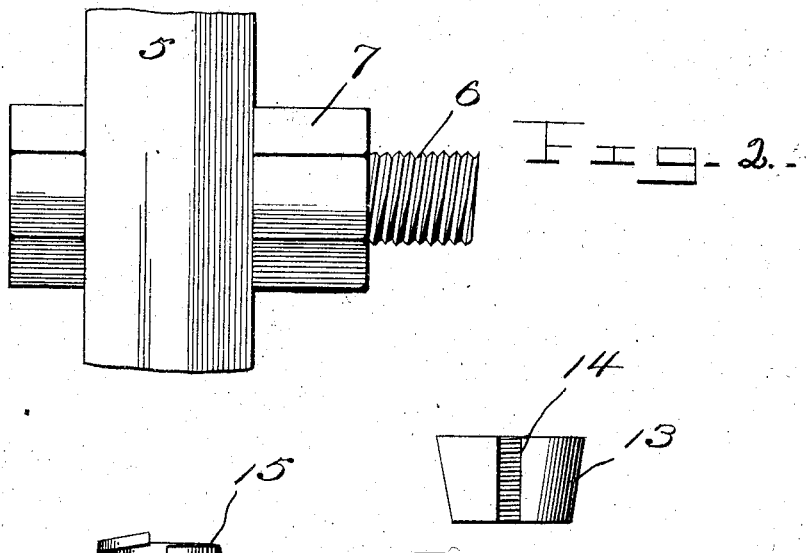
Witnesses
E. M. Colford
Inventors
Charles Scudder
Richard Barlow
By Chandler & Chandler
Attorneys No. 791,825. Patented June 6, 1905.

UNITED STATES PATENT OFFICE.

CHARLES SCUDDER AND RICHARD BARLOW, OF TRENTON, NEW JERSEY.

NUT-LOCK.

SPECIFICATION forming part of Letters Patent No. 791,825, dated June 6, 1905.

Application filed March 8, 1905. Serial No. 248,979.

*To all whom it may concern:*

Be it known that we, CHARLES SCUDDER and RICHARD BARLOW, citizens of the United States, residing at Trenton, in the county of Mercer, State of New Jersey, have invented certain new and useful Improvements in Nut-Locks; and we do hereby declare the following to be a full, clear, and exact description of the invention, such as will enable others skilled in the art to which it appertains to make and use the same.

This invention relates to nut-locks; and it has for its object to provide a lock which will be contained within the nut and will be of such structure that when the nut is finally screwed up the lock will be gradually adjusted to locking or active position and will hold the nut frictionally but securely against return rotation, excepting when unusual power is applied thereto.

Other objects and advantages of the invention will be understood from the following description.

In the drawings forming a portion of this specification, and in which like numerals of reference indicate similar parts in the several views, Figure 1 is a view showing a bolt passed through a body and equipped with a nut having a lock embodying the present invention, the nut and other parts, with the exception of the bolt, being shown in section. Fig. 2 is a top plan view of the structure shown in Fig. 1. Fig. 3 is an elevation of the bushing and showing its longitudinal slot. Fig. 4 is an elevation of the slotted spring-washer looking at the slotted side.

Referring now to the drawings, there is shown a body 5, through which is passed a common type of bolt 6, threaded in the usual manner.

The nut employed comprises an angular body 7 for convenience of application of a wrench thereto and which nut instead of having the usual cylindrical threaded passage to receive the bolt has a smooth or unthreaded passage 9, which is tapered downwardly of the nut to an inwardly-directed flange 10 at the base of the nut. From the face of this tapered passage or opening there projects a rib 12, that extends longitudinally of the nut from end to end thereof. In the tapered bore of the nut is disposed a correspondingly-tapered or frusto-conical spring-bushing 13, which is split or slotted longitudinally, as shown at 14, to receive loosely the rib 12, so that the bushing may have a longitudinal movement in the nut while being held against rotation therein. Between the lower end of the bushing and the bottom flange 10 there is disposed a split spring-washer 15, which has one end sprung above the other, so that it is, in fact, very nearly a single convolution of a helix. When the nut is screwed onto the bolt, it moves downwardly of the bolt in the usual manner, the bolt engaging directly the threads of the bushing and the operation being very easy because of the fact that the bushing is expanded to its maximum and fits the bolt only loosely. When the bottom of the nut strikes the body through which the bolt is passed, continued rotation of the nut causes the bushing to travel down the bolt, while the nut-body is held against such travel. As the bushing travels down the bolt it moves in the direction of the minor end of the tapered bore of the nut, so that the bushing is contracted upon the bolt and is caused to bind it tightly. The downward movement of the bushing, furthermore, causes it to compress the spring-metal washer against the base-flange of the nut-body, thus forcing the nut against the body through which the bolt is passed and serving to establish tight frictional engagement of the nut against said body, so that the nut is, in fact, held against return rotation both by the frictional engagement of the nut against the body through which the bolt is passed and by friction between the bushing and bolt.

It will of course be understood that the lower face of the nut may be roughened, if desired, to intensify the friction between it and the body and that any suitable materials and proportions may be used for the various parts without departing from the spirit of the invention.

To hold the bushing, and consequently the washer, against upward displacement from the body of the nut, the upper edge of the nut may be flanged over the bore, as illustrated at 20, either continuously or at intervals.

What is claimed is—

1. A self-locking nut comprising a body, a threaded bushing within the top for engagement of a bolt therewith and yieldable means coöperating with the bushing and nut-body for yieldably resisting longitudinal movement of the bushing.

2. A self-locking nut comprising a body having a tapered bore, a tapered split bushing disposed in the bore of the body and movable longitudinally therein, means for holding the bushing against rotation in the body, and a spring-washer disposed between the bushing and one end of the body and adapted to yieldably resist movement of the bushing from the other end of the body.

3. A self-locking nut comprising a body having a bore and an inwardly-directed flange at one end of the bore, the bore being tapered to the flange, and the body having a longitudinal internal rib above the flange, a tapered split bushing internally threaded and disposed in the bore of the body and receiving the rib in its split, and means disposed between the bushing and the flange for yieldably resisting movement of the bushing in the direction of the flange.

In testimony whereof we affix our signatures in presence of two witnesses.

CHARLES SCUDDER.
    RICHARD BARLOW.

Witnesses:
    JAS. H. BLACKWOOD,
    E. M. COLFORD.